(12) United States Patent
Keeslar et al.

(10) Patent No.: US 6,957,828 B2
(45) Date of Patent: Oct. 25, 2005

(54) INFLATABLE LAP BELT SAFETY BAG

(75) Inventors: Kevin J. Keeslar, Chandler, AZ (US); Daniel Nick Foubert, Mesa, AZ (US)

(73) Assignee: AmSafe, Inc., Phoenix, AZ (US)

( * ) Notice: Subject to any disclaimer, the term of this patent is extended or adjusted under 35 U.S.C. 154(b) by 166 days.

(21) Appl. No.: 10/672,606

(22) Filed: Sep. 26, 2003

(65) Prior Publication Data

US 2005/0067820 A1 Mar. 31, 2005

(51) Int. Cl.[7] .............................................. B60R 21/18
(52) U.S. Cl. ................................... 280/733; 280/730.2
(58) Field of Search ............................. 280/733, 728.1, 280/730.2; B60R 21/18

(56) References Cited

U.S. PATENT DOCUMENTS

| | | | |
|---|---|---|---|
| 5,871,230 A | * | 2/1999 | Lewis ........................ 280/733 |
| 6,378,898 B1 | * | 4/2002 | Lewis et al. ................ 280/733 |

FOREIGN PATENT DOCUMENTS

| | | | |
|---|---|---|---|
| DE | 41 16 162 A1 | * | 11/1992 |
| DE | 42 11 209 A1 | * | 10/1993 |
| GB | 2 368 050 A | * | 4/2002 |
| JP | 63-258239 A | * | 10/1988 |
| JP | 11-189117 A | * | 7/1999 |

* cited by examiner

*Primary Examiner*—Ruth Ilan
(74) *Attorney, Agent, or Firm*—Mayer, Brown, Rowe, and Maw LLP

(57) ABSTRACT

A safety bag comprising a lower portion secured to a lap belt proximate an inflation source, a middle section and an upper section. The upper section is folded into the middle section and the middle section and upper section are folded into the lower section. When the bag inflates, the lower section first inflates to one side away from the inflation source, the middle section next inflates at approximately a right angle to the lower section, and the upper section inflates last back towards the inflation source. Upon inflation, the bag assumes approximately a "C-shape."

16 Claims, 3 Drawing Sheets

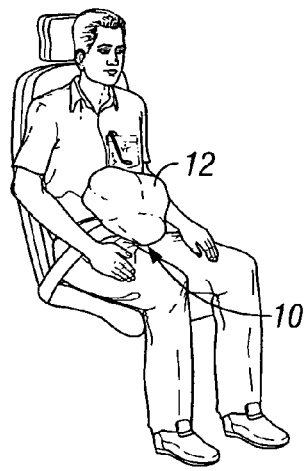
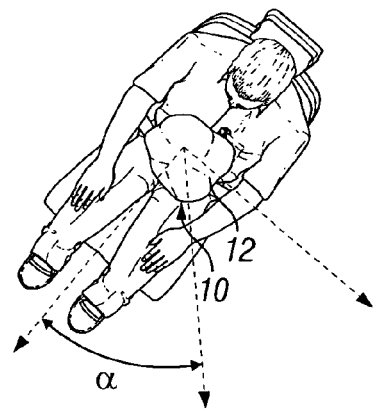
FIG. 3A                    FIG. 3B
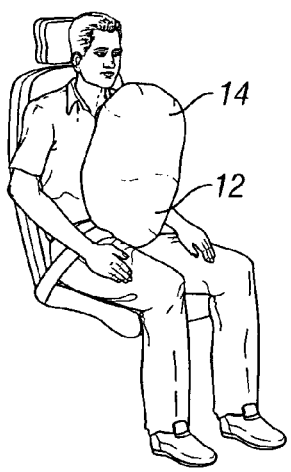
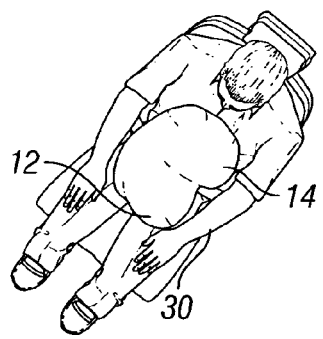
FIG. 4A                    FIG. 4B

INFLATABLE LAP BELT SAFETY BAG

BACKGROUND OF THE INVENTION

1. Field of the Invention

The present invention relates to an inflatable lap belt safety bag. Particularly, the present invention is directed to an inflatable lap belt safety bag which provides improved safety characteristics.

2. Description of Related Art

Inflatable safety bags are known in the art. In some applications, these safety bags may be connected to a lap belt and an inflation source thereabout to provide for an inflatable lap belt safety bag. The safety bags are generally operable through electronics which couple an inflation activation system to a deceleration sensor circuitry. Thus, when a deceleration characteristic of an impact event occurs, a signal is sent to the activation system. The activation system activates an inflation source which inflates a bag of air to provide a cushion for the user in the event of an impact.

Such conventional methods and systems generally have been considered satisfactory for their intended purpose. However, there are disadvantages to the known systems. Specifically, the known systems utilize what is essentially a single chamber air bag that is inflated completely upon activation. These single chamber air bags provide cushioning for the entire body by inflating all at once directly in front of the user. However, the impact giving rise to the inflation may not occur head-on or may have some side component. The typical single chamber air bag that inflates all at once directly in front of the user does not adequately protect against side impact events. Although side air bags are available, a mounting system for such air bags may not be available. Thus, a need exists in the art for a single chamber air bag inflatable from a lap belt that can provide side impact protection.

SUMMARY OF THE INVENTION

The purpose and advantages of the present invention will be set forth in and apparent from the description that follows, as well as will be learned by practice of the invention. Additional advantages of the invention will be realized and attained by the methods and systems particularly pointed out in the written description and claims hereof, as well as from the appended drawings.

To overcome the disadvantages of the prior art, a unique lap belt safety bag is provided. The safety bag according to preferred embodiments of the present invention is characterized in that it comprises a lower portion secured to a lap belt proximate an inflation source, a middle section and an upper section. According to the invention, the unique folding sequence of the air bag into the lap belt housing coupled with the shape of the air bag provides a controlled inflation sequence which will inflate the air bag in such a manner as to provide side impact protection or a combination of side/frontal protection, such as a 45° angled seat. According to the preferred embodiments, the upper section is folded into the middle section and the middle section and upper section are folded into the lower section. When the bag inflates, the lower section first inflates to one side away from the inflation source, the middle section next inflates at approximately a right angle to the lower section, and the upper section inflates last back towards the inflation source. Upon inflation, the bag assumes approximately a "C-shape." It should be understood that by "C-shape," both a forward "C" and a backwards "C" are meant, as either shape will be assumed depending upon whether the bag inflates to the left or to the right. A primary advantage of this "C"-shape over the other prior art is that this shape greatly simplifies the deployment of the lap-belt mounted airbag in a 45° or 90° side-impact scenario, where the occupant's arm would otherwise interfere with the deploying air bag action. The "C"-shape air bag design avoids this problem.

Another embodiment of the invention is a lap belt comprising a housing and an inflatable safety bag. The safety bag comprises a lower section, a middle section and an upper section, and the upper section is folded into the middle section and the upper section and middle section are folded into the lower section. The air bag is then folded into the housing and attached to the lap belt.

It is to be understood that both the foregoing general description and the following detailed description are exemplary and are intended to provide further explanation of the invention claimed.

The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF THE DRAWINGS

FIG. 3A is a view of an air bag according to an embodiment of the invention at the initial stage of an impact event.

FIG. 3B is another view of the event depicted in FIG. 3A.

FIG. 4A is a view of an air bag according to an embodiment of the invention at an intermediate stage of an impact event.

FIG. 4B is another view of the event depicted in FIG. 4A.

DETAILED DESCRIPTION OF THE PREFERRED EMBODIMENT

Figure 1:
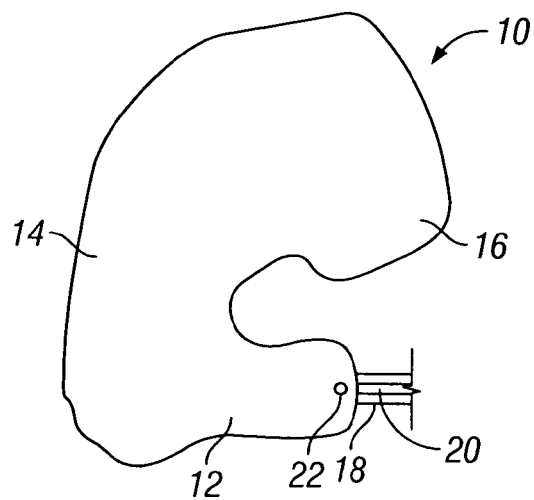
FIG. 1 is a front view of an air bag according to an embodiment of the invention.

Reference will now be made in detail to the present preferred embodiments of the invention, examples of which are illustrated in the accompanying drawings. For purpose of explanation and illustration, and not limitation, an exemplary embodiment of the invention is shown in FIG. 1 and is designated generally by reference character 10.

FIG. 1 depicts an inflated air bag 10 according to an embodiment of the invention. The air bag 10 generally includes a lower section 12, a middle section 14 and an upper section 16. The air bag 10 is connected to a lap belt 18, typically via stitching. The air bag 10 is also coupled to an inflation source 22 via tubing 20 from which air enters the air bag, proximate the lower section 12, for inflation of the air bag 10. The tubing 20 is coupled to an air source (not shown) and a circuitry, as known in the art, to detect an impact event in which inflation of the air bag 10 would be desirable. As shown, the air bag 10 has approximately a C shape. Further, upon inflation, the lower section 12 inflates first to one side away from the inflation source 22, the middle section 14 inflates next at approximately a right angle to the lower section 12, and the upper section 16 inflates last towards the inflation source 22. This sequencing action, as described above, aids the air bag deployment action to avoid the seat occupant's arms, thus avoiding potential occupant injury and aiding in the correct deployment of the air bag.

Figure 2A:
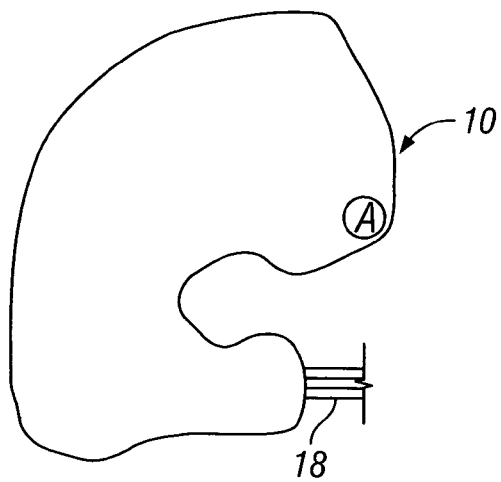
FIG. 2A is a view of a pre-inflated air bag according to an embodiment of the invention.
Figure 2B:
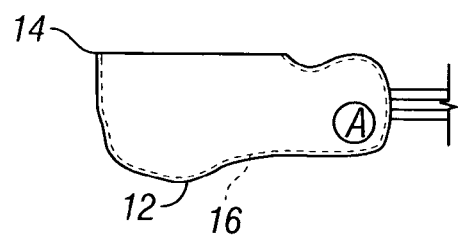
FIG. 2B is a view of a partially folded air bag according to an embodiment of the invention.
Figure 2C:
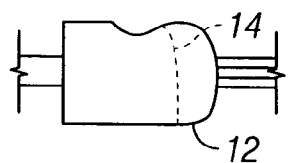
FIG. 2C is a view of a further partially folded air bag according to an embodiment of the invention.
Figure 2D:
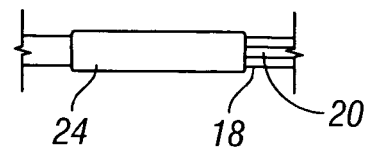
FIG. 2D is a view of a folded air bag according to an embodiment of the invention.
Figure 5A:
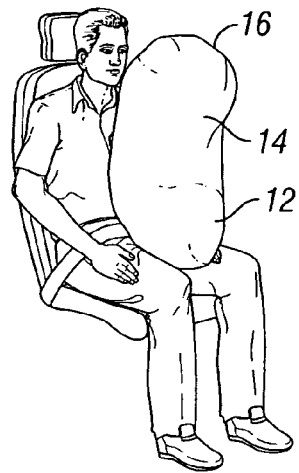
FIG. 5A is a view of an air bag according to an embodiment of the invention at a further intermediate stage of an impact event.
Figure 5B:
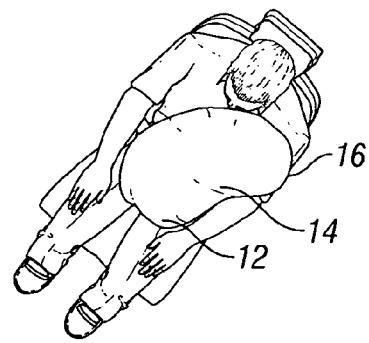
FIG. 5B is another view of the event depicted in FIG. 5A.

To accomplish the specified inflation sequence, the air bag 10 is stored in a particular manner. The folding of the air bag 10 for storage on the lap belt is depicted in FIGS. 2A to 2D. In FIG. 2A, the air bag 10 is laid flat. In FIG. 2B, the upper section 16 (shown by the dotted line) is tucked downward into the middle section 14 and further into the lower section 12 until the perimeter of the upper section 16 is at the bottom of the bag. Point A illustrates how the bag is tucked. In FIG. 2C, the remainder of the bag is tucked into the lower section 12 under the earlier tucked section. Finally, in FIG. 2D, the bag is folded inwards and encased in a bag housing 24. The bag housing 24 is provided with stitching that will burst apart upon inflation, as is known in the art. In the preferred embodiment, no internal tethers or webbing are utilized, although either internal webbing or tethers could be added to aid in folding and deployment.

Figure 6A:
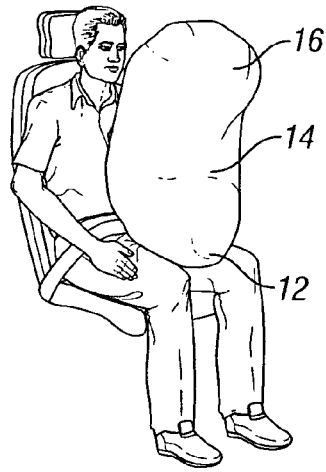
FIG. 6A is a view of an air bag according to an embodiment of the invention at a final stage of an impact event.
Figure 6B:
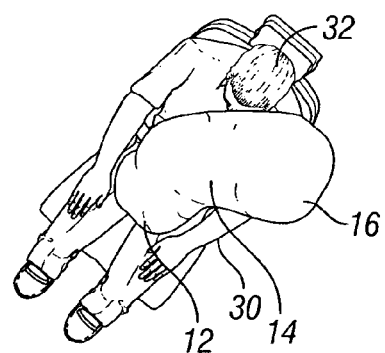
FIG. 6B is another view of the event depicted in FIG. 6A.

FIGS. 3A–6B depict the bag in use. FIGS. 3A and 3B depict the initial stages of air bag deployment from different viewing angles, early in the post impact event initiation sequencing. In this depiction, the lower portion 12 of the air bag 10 has just begun to inflate. In FIGS. 4A and 4B, intermediate timing in the post-impact event sequencing, the middle portion 14 of the air bag 10 is filling with air. It can be seen, especially from FIG. 4B, that the C shape of the bag will enable the bag to inflate around the user's arm 30. In FIGS. 5A and 5B, further intermediate timing in the post-impact event sequencing, the lower portion 12 and middle portion 14 are fully inflated and the upper portion 16 is positioned for inflation. FIGS. 6A and 6B, final timing in the post-impact event sequencing, show the bag 10 fully inflated as the upper portion 16 has deployed over the user's arm 30 and to the side of the user's head 32.

The above described FIGS. 3A–6B depict a preferred embodiment of the present invention wherein the bag is deployed at approximately an angle, $\alpha$, relative to the front of the user. In this embodiment, with $\alpha$ being 45°, the air bag provides both front and side component protections.

In alternative embodiments, the air bag can be deployed more towards either the front or the side by moving the air bag housing a slight distance either towards the front or the side of the user. In the preferred embodiment, a shifting of the air bag housing and connection to the lap belt of approximately three inches to either side of the 45° position will result in an inflated air bag having a more forward or more side component. Because of the unique shape of the bag, which in its neutral 45° position provides both some forward and side component protection, only a slight positioning change in the housing and connection along the lap belt will produce the desired level of front or side component protection.

Thus, present air bag construction has another advantage in that it is adaptable to a variety of seat/occupant orientations. That is, because the present air bag shape provides both a forward and side impact protection component, the air bag may conveniently be used in connection with a variety of seat/occupant orientation. Assuming that an impact event will occur at the front of the vehicle or aircraft, a slight shifting of the housing and connection will give rise to an air bag having a 0° orientation, i.e., to protect the occupant positioned facing the front of the vehicle. Here, the air bag inflates directly in front of the user to provide a forward impact protection. In other seating arrangements, the seat may be at a right angle to the front of the vehicle. There, the housing will be shifted towards the side of the user to provide a 90° orientation.

It will be apparent to those skilled in the art that various modifications and variations can be made in the method and system of the present invention without departing from the spirit or scope of the invention. Thus, it is intended that the present invention include modifications and variations that are within the scope of the appended claims and their equivalents.

What is claimed is:

1. An inflatable lap belt safety bag comprising:
    a lower section secured to a lap belt proximate an inflation source;
    a middle section; and
    an upper section;
    wherein the upper section is tucked into the middle section and the upper section and middle section are tucked into the lower section; and
    wherein upon inflation, the lower section inflates first to one side away from the inflation source, the middle section inflates next, and the upper section inflates last towards the inflation source.

2. The safety bag of claim 1 wherein upon inflation the bag has approximately a C-shape.

3. The safety bag of claim 1 wherein the bag is adapted to inflate around a user's arm.

4. The safety bag of claim 1 wherein the upper section is adapted to inflate to the side of a user's head.

5. The safety bag of claim 1 wherein the bag provides protection from both a forward component and a side component.

6. The safety bag of claim 1 wherein the bag is adapted to inflate at an angle of 45° relative to the front of a user.

7. A lap belt comprising:
    a housing; and
    an inflatable safety bag wherein the safety bag comprises a lower section, a middle section and an upper section, and wherein the upper section is tucked into the middle section and the upper section and middle section are tucked into the lower section;
    and wherein the air bag is folded into the housing and attached to the lap belt; and
    wherein upon inflation, the lower section inflates first to one side away from an inflation source, the middle section inflates next, and the upper section inflates last towards the inflation source.

8. The lap belt of claim 7 further comprising a tubing connected at one end to an air source and at another end to the lower section of the air bag.

9. The lap belt of claim 7 wherein upon inflation the bag has approximately a C-shape.

10. The lap belt of claim 7 wherein the bag is adapted to inflate around a user's arm.

11. The lap belt of claim 7 wherein the upper section is adapted to inflate to the side of a user's head.

12. The lap belt of claim 7 wherein the airbag provides protection from both a forward component and a side component.

13. The lap belt of claim 7 wherein the housing is adapted to inflate the air bag at an angle of 45° relative to the front of a user.

14. A method for providing a vehicle restraint system comprising:
- determining an orientation of a vehicle seat in relation to an expected direction for an impact event;
- providing a lap belt comprising:
  - a housing; and
  - an inflatable safety bag wherein the safety bag comprises a lower section, a middle section and an upper section, and wherein the upper section is tucked into the middle section and the upper section and middle section are tucked into the lower section; and wherein the air bag is folded into the housing and attached to the lap belt; and
  - wherein upon inflation, the lower section inflates first to one side away from an inflation source, the middle section inflates next, and the upper section inflates last towards the inflation source; and
- positioning the housing to direct inflation of the air bag towards the expected direction of an impact.

15. The method of claim 14 wherein upon inflation the bag has approximately a C-shape.

16. The method of claim 14 wherein the bag is adapted to inflate around a user's arm.

* * * * *